Feb. 27, 1934.   M. PIER ET AL   1,949,109
REACTION WITH HYDROGEN AND IN APPARATUS THEREFOR
Filed June 13, 1930
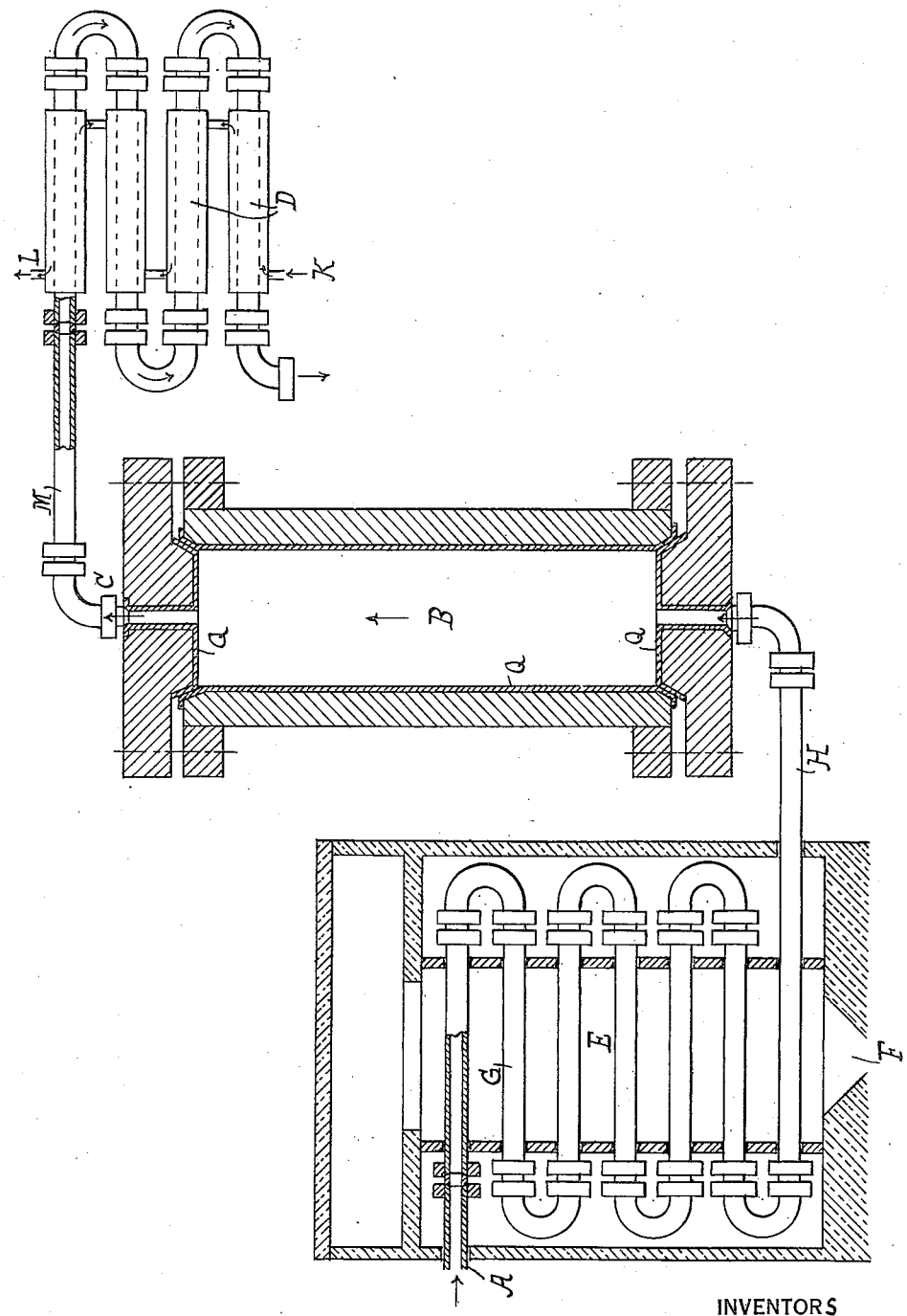
INVENTORS
Mathias Pier
Kurt Wissel
Walter Dinkler
By Hauff & Warland
ATTORNEYS Patented Feb. 27, 1934

1,949,109

UNITED STATES PATENT OFFICE 1,949,109

REACTION WITH HYDROGEN AND IN APPARATUS THEREFOR

Mathias Pier, Heidelberg, Kurt Wissel, Ludwigshafen-on-the-Rhine, and Walter Dinkler, Mannheim, Germany, assignors, by mesne assignments, to Standard-I. G. Company, Linden, N. J., a corporation of Delaware Application June 13, 1930, Serial No. 460,940
In Germany June 27, 1929

9 Claims. (Cl. 196—53)

This invention relates to improvements in carrying out reactions with hydrogen and in particular under pressure, and in apparatus therefor.

In reactions carried out with hydrogen, such as the treatment of coals, tars, mineral oils and other carbonaceous materials or their distillation and conversion products or residues in the presence of hydrogen, especially under pressure, it is, as is well known, difficult to find suitable constructional materials for the apparatus which are sufficiently resistant chemically and physically and in particular against hydrogen and any sulphur present, at the temperatures and pressures employed. Difficulties are also encountered in the synthesis of ammonia. Thus for example iron is decarbonized by hydrogen and becomes brittle after use for a short time. The pressure bearing iron walls especially are easily destroyed by hydrogen so that the walls must be kept cold or recourse must be made to highly alloyed steels in order to avoid the injurious influence of the hydrogen. Moreover, there are only very few materials, and these are expensive ones, which are stable to any extent at elevated temperature against sulphur and sulphur compounds, especially hydrogen sulphide.

We have now found that in reactions carried out with hydrogen, zinc alloys having a melting point above 500° centigrade may be employed with advantage as materials for constructing or coating those parts of the apparatus which come into contact with the hot reaction materials. Alloys of zinc and copper, as for example those having approximately the composition of brass, constitute materials which are resistant in every respect, so that, according to the present invention, at least those parts of the apparatus used in the processes hereinbefore described which come into contact with the hot reacting materials are wholly or partially constructed of or coated with the said alloys. The material in question is impermeable to hydrogen, which is not the case with copper itself, and it is also stable to hydrocarbons. Moreover, contrasted with copper, it is not attacked by sulphur compounds. For example there may be a concentration of hydrogen sulphide of several per cent in the reaction materials or of several atmospheres in the reaction gases without the occurrence of appreciable attack by hydrogen sulphide even after use for a long time. The employment of the said alloys is therefore of great importance in the treatment of coals, tars, mineral oils and the like with hydrogen under pressure.

Another important advantage is that the heat transfer with the said alloys is very good, so that they may be employed with advantage for example for preheaters and heat-exchangers. It is preferable to employ alloys containing from 40 to 65 per cent of copper and from 60 to 35 per cent of zinc. Other suitable materials, especially metals, may also be added to the alloys, for example to increase the strength, as for example manganese, nickel, iron, cobalt, aluminium, silver and the like. Thus alloys having the composition 65 per cent of copper, 25 per cent of zinc, 4 per cent of nickel, 2 per cent of cobalt and 4 per cent of aluminium, or the composition 59 per cent of copper, 35 per cent of zinc, 3 per cent of aluminium and 3 per cent of manganese are suitable.

Alloys of iron and zinc; nickel and zinc; iron, nickel and zinc; copper, iron and zinc; and the like are also very suitable. Slightly alloyed steels which are not stable to sulphur may also be provided with an addition of zinc whereby their resistance to corrosion by hydrogen under pressure as well as by hydrogen sulphide and carbon monoxide is, contrary to expectation, considerably increased. It is preferable to melt these alloys under pressure. The compounds, such as ammonia, water vapour, phenols and the like set free for example during the destructive hydrogenation of coals exert no injurious influence on the said constructional materials. Even if a sulphur compound such as hydrogen sulphide is present and its partial pressure in the reaction gases amounts to several atmospheres, no appreciable attack by sulphur takes place even after use for long periods of time.

It has been further found that the concentration of hydrogen is preferably regulated according to the amount of sulphur in the initial materials, so that for example with initial materials having a high content of sulphur a higher concentration of hydrogen is employed than with initial materials poor in, or free from, sulphur.

It has been still further found that the said alloys are also eminently suitable for the construction or coating of the parts of apparatus for other reactions than those described in which hydrogen under pressure is employed, as for example in the synthesis of ammonia or the catalytic reduction of the oxides of carbon. While when copper is employed hydrogen diffuses through, alloys of copper and zinc do not have this drawback. Neither are they attacked by carbon monoxide. Further they have the advantage that they do not adversely affect reactions which are usually carried out with hydrogen; thus for example in the synthesis of methanol and similar reactions between carbon monoxide and hydrogen they do not cause the deposition of carbon or the formation of methane, as is readily the case with for example iron.

The process according to the present invention is particularly adapted for operating under pressure, as for example at pressures of 10 or 20 atmospheres, and the advantages become particularly apparent at pressures of 50, 100, 200, 1000 or more atmospheres.

The apparatus is advantageous for reactions with hydrogen carried out at all temperatures below the melting point of the zinc alloy employed. The advantages become particularly apparent at working temperatures above about 300° C., and in particular above 380° or 400° C.

In the accompanying drawing an apparatus for carrying out the process according to the present invention is illustrated, partly in vertical section. Our invention is, however, not limited to the apparatus illustrated therein, but may be varied at will in accordance with the conditions of working.

Referring to the drawing in detail, A denotes a feed line from any convenient source of raw material and of hydrogen. G is a preheating coil, capable of being heated by heating gases introduced at F into the vessel E. The pressure bearing material of the said coil consists of 6 per cent chromium steel. H is a feed line leading from the coil G to the high pressure reaction vessel B the pressure bearing wall of which is constructed of iron. C is the point of removal of the reaction products from the said vessel B, which are passed by the line M to a condenser D, into which a cooling medium is introduced at K and removed at L. The said apparatus is provided throughout with a lining A consisting of an alloy of 61.7 per cent of copper and 38.3 per cent of zinc.

The following examples will further illustrate the nature of this invention, but the invention is not restricted to these examples. Example 1 is with reference to the accompanying drawing.

*Example 1*

Referring to the drawing Mexican Panuco oil containing 4.5 per cent of sulphur is mixed with hydrogen under a pressure of 200 atmospheres and heated to a temperature of 450° C. in the coil G. It is then treated in the reaction vessel B in the presence of a catalyst comprising molybdic acid and zinc oxide. The reaction product is condensed at D. After use for a long period of time the bright material of the apparatus becomes slightly dull, but otherwise it shows no change.

*Example 2*

Brown coal low temperature distillation tar containing 1.9 per cent of sulphur is treated with hydrogen at 200 atmospheres pressure and at 490° centigrade. The parts of the high pressure apparatus which come into contact with the hot materials are coated with an alloy of 51 per cent of copper, 42 per cent of zinc and 7 per cent of nickel. After use for a long period of time the material shows no sign of attack.

*Example 3*

A mixture of 75 per cent of hydrogen and 25 per cent of nitrogen is allowed to flow at from 500° to 550° C. under a pressure of 200 atmospheres over an activated iron catalyst in a high pressure vessel coated with brass. The effluent gases, which carry with them the ammonia formed, are led through a heat exchanger consisting of a bundle of brass tubes before the ammonia is removed by absorption. The parts of brass employed show no signs of attack even after use for a long time. A complete protection against attack by hydrogen is effected by coating the pressure bearing walls with brass; the tubes of the heat exchanger have a smaller tendency to permeability and short circuiting than iron tubes.

Smaller or greater pressures as for example 50 atmospheres or 1000 atmospheres or more may be employed instead of 200 atmospheres.

*Example 4*

A gas mixture consisting of 30 per cent of carbon monoxide and 70 per cent of hydrogen is passed at 350° C. under a pressure of 200 atmospheres over a catalyst of zinc oxide and chromium oxide in an apparatus which is lined with an alloy of 41 per cent of copper, 49 per cent of zinc and 10 per cent of nickel. Methanol is obtained in good yields. No attack of the material can be detected even after use for a long period of time.

*Example 5*

A gas mixture of 20 per cent of carbon monoxide and 80 per cent of hydrogen is passed at 380° C. under a pressure of 20 atmospheres over a catalyst consisting of 2 parts of bismuth oxide and 1 part of alumina. High molecular alcohols are formed as well as methanol. The parts of the apparatus which come into contact with the hot gases are coated with an alloy of 57 per cent of copper, 42 per cent of zinc and 1 per cent of manganese. There is no change in the material even after use for a long period of time.

*Example 6*

An American heating oil containing 1.8 per cent of sulphur is treated with hydrogen in a high pressure reaction vessel at 480° centigrade under a pressure of 200 atmospheres in the presence of a catalyst prepared from tungstic acid and zinc. The parts of the apparatus coming into contact with the hot reaction materials are coated with a lining consisting of an alloy composed of 50 per cent of nickel and 50 per cent of zinc. Even after operation for long periods of time there is no appreciable attack on the material.

*Example 7*

A crude oil having a sulphur content of 3 per cent is treated with hydrogen at 450° centigrade under a pressure of 200 atmospheres in a high pressure reaction vessel which is provided with a lining consisting of an alloy composed of 15 per cent of zinc and 85 per cent of iron. The material shows no change even after operation for long periods of time.

*Example 8*

A gaseous mixture consisting of 4 volumes of hydrogen and 1 volume of nitrogen is passed at a temperature of between about 500° and 550° C. and under a pressure of about 200 atmospheres over an activated iron catalyst contained in a reaction vessel which is lined with an alloy consisting of 88 per cent of iron and 12 per cent of zinc. A high yield of ammonia is thus obtained. The material of the apparatus shows no change in structure even after being employed for a very long time.

Example 9

A middle oil containing 4 per cent of sulphur is passed in a vaporous state together with hydrogen under a pressure of about 200 atmospheres and at a temperature of about 460° C. over a catalyst prepared from molybdic acid and chromium oxide. About 6 cubic meters of hydrogen are present for each kilogram of vaporized middle oil. Approximately 95 per cent of the sulphur contained in the initial materials are thus removed in the form of hydrogen sulphide. Those parts of the apparatus which come into contact with the hot gases and vapours are lined with an alloy consisting of 48 per cent of copper, 38 per cent of zinc, 12 per cent of nickel and 2 per cent of manganese. These materials are not corroded even after the plant has been in operation for a long period of time. If a middle oil containing less sulphur is treated, for example a tar middle oil containing about 0.8 to 1 per cent of sulphur under the same conditions the mixture passed over the catalyst consists of only 2 to 3 cubic meters of hydrogen for each kilogram of oil vapour.

What we claim is:—

1. The process of converting a carbonaceous substance into a valuable liquid, which comprises subjecting the said substance to destructive hydrogenation by means of a hydrogenating gas and heat at a temperature sufficient to promote the conversion and at a pressure of at least 20 atmospheres in a reaction vessel the inner surface of which is constructed of a zinc alloy having a melting point above 500° C.

2. The process of converting a carbonaceous substance into a valuable liquid, which comprises subjecting the said substance to destructive hydrogenation by means of a hydrogenating gas and heat at a temperature sufficient to promote the conversion and at a pressure of at least 20 atmospheres in a reaction vessel the inner surface of which is constructed of an alloy of zinc and copper having a melting point above 500° C.

3. The process of converting a carbonaceous substance into a valuable liquid, which comprises subjecting the said substance to destructive hydrogenation by means of a hydrogenating gas and heat at a temperature sufficient to promote the conversion and at a pressure of at least 20 atmospheres in a reaction vessel the inner surface of which is constructed of brass.

4. The process of converting a carbonaceous substance into a valuable liquid, which comprises subjecting the said substance to destructive hydrogenation by means of a hydrogenating gas and heat at a temperature sufficient to promote the conversion and at a pressure of at least 20 atmospheres in a reaction vessel, the inner surface of which is constructed of a zinc alloy having a melting point above 500° C. and containing an addition of a substance increasing its strength.

5. The process of converting a carbonaceous substance into a valuable liquid, which comprises subjecting the said substance to destructive hydrogenation by means of a hydrogenating gas and heat at a temperature sufficient to promote the conversion and at a pressure of at least 20 atmospheres in a reaction vessel the inner surface of which is constructed of a zinc alloy having a melting point above 500° C. and containing an addition of iron.

6. The process of converting a carbonaceous substance into a valuable liquid, which comprises subjecting the said substance to destructive hydrogenation by means of a hydrogenating gas and heat at a temperature sufficient to promote the conversion and at a pressure of at least 20 atmospheres in a reaction vessel the inner surface of which is constructed of a zinc alloy having a melting point above 500° C. and regulating the concentration of hydrogen according to the amount of sulphur in the initial materials, so that with initial materials having a high content of sulphur a higher concentration of hydrogen is employed than with initial materials poor in or free from sulphur.

7. A process of converting a carbonaceous substance into a valuable liquid which comprises subjecting said substance to destructive hydrogenation by means of a hydrogenating gas and heat at a temperature sufficient to promote the conversion and a pressure of at least 20 atmospheres while confining the hot reacting materials by a surface constructed of a zinc alloy having a melting point above 500° C.

8. The process of treating a carbonaceous substance with hydrogen which comprises subjecting said substance to the action of hydrogen at a temperature above about 300° C. and a pressure of at least 20 atmospheres in a reaction vessel, the inner surface of which is constructed of a zinc alloy having a melting point above about 500° C.

9. The process as defined in claim 1 in which the zinc alloy contains at least 15 per cent of zinc.

MATHIAS PIER.
KURT WISSEL.
WALTER DINKLER.